United States Patent
Zamora Rodriguez et al.

(10) Patent No.: US 9,669,589 B2
(45) Date of Patent: Jun. 6, 2017

(54) HYBRID SOLID-INFLATABLE MANDREL FOR BLADE MANUFACTURING

(71) Applicant: Siemens Aktiengesellschaft, München (DE)

(72) Inventors: Alonso O. Zamora Rodriguez, Broomfield, CO (US); Edward A. Mayda, Thornton, CO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 98 days.

(21) Appl. No.: 14/733,077

(22) Filed: Jun. 8, 2015

(65) Prior Publication Data
US 2016/0354968 A1    Dec. 8, 2016

(51) Int. Cl.
  *B29C 70/44*  (2006.01)
  *B29C 33/50*  (2006.01)
  *B29D 99/00*  (2010.01)
  *B29L 31/08*  (2006.01)

(52) U.S. Cl.
  CPC .......... *B29C 70/446* (2013.01); *B29C 33/505* (2013.01); *B29C 70/44* (2013.01); *B29C 70/443* (2013.01); *B29D 99/0028* (2013.01); *B29L 2031/085* (2013.01)

(58) Field of Classification Search
  CPC ..... B29C 70/443; B29C 70/446; B29C 70/44; B29C 30/505; B29L 2031/085
  See application file for complete search history.

(56) References Cited

U.S. PATENT DOCUMENTS

| | | | |
|---|---|---|---|
| 3,942,753 A | 3/1976 | Sachs | |
| 6,596,121 B1 | 7/2003 | Reynolds, Jr. | |
| 7,597,772 B2 * | 10/2009 | Martinez Cerezo | B29C 70/34 156/169 |
| 7,622,066 B2 * | 11/2009 | Brustad | B29C 70/44 264/257 |
| 7,980,840 B2 * | 7/2011 | Burchardt | B29C 33/0061 264/102 |
| 8,007,624 B2 | 8/2011 | Stiesdal | |
| 8,293,051 B2 | 10/2012 | Morris et al. | |
| 8,382,440 B2 * | 2/2013 | Baker | F03D 1/0675 416/226 |
| 8,919,754 B2 | 12/2014 | Schibsbye | |
| 2005/0211843 A1 | 9/2005 | Simpson et al. | |
| 2011/0274553 A1 | 11/2011 | Stiesdal | |
| 2013/0153144 A1 * | 6/2013 | Tupper | B29C 33/405 156/307.1 |

FOREIGN PATENT DOCUMENTS

WO   2013113749 A1   8/2013

* cited by examiner

Primary Examiner — Robert B Davis

(57) ABSTRACT

A mandrel (20, 30) defines a void geometry in a layup for a blade shell (73) via a rigid mandrel core (22, 32) and a plurality of expandable bladders (24A-F, 34A-F) attached adjacently to each other in sequence around a periphery of the core, forming an expandable outer cover on the mandrel. The bladders are controllably expandable (50, 50B, 60) individually or in proper subsets of all the bladders to adjust pressure distribution and mandrel position within the layup after closing a blade shell mold over the layup. The bladders may be transversely partitioned (104) at multiple spanwise (S) positions along the mandrel in order to define additional sets of adjustable bladders along the span of the mandrel.

16 Claims, 5 Drawing Sheets

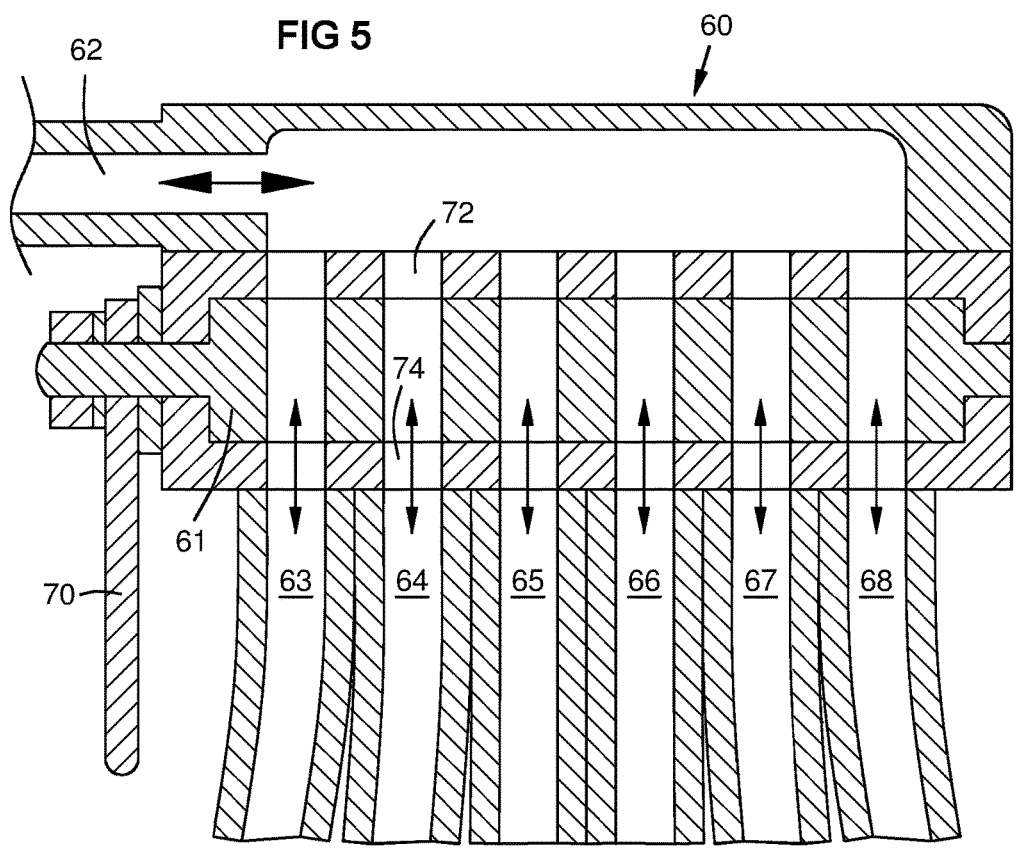
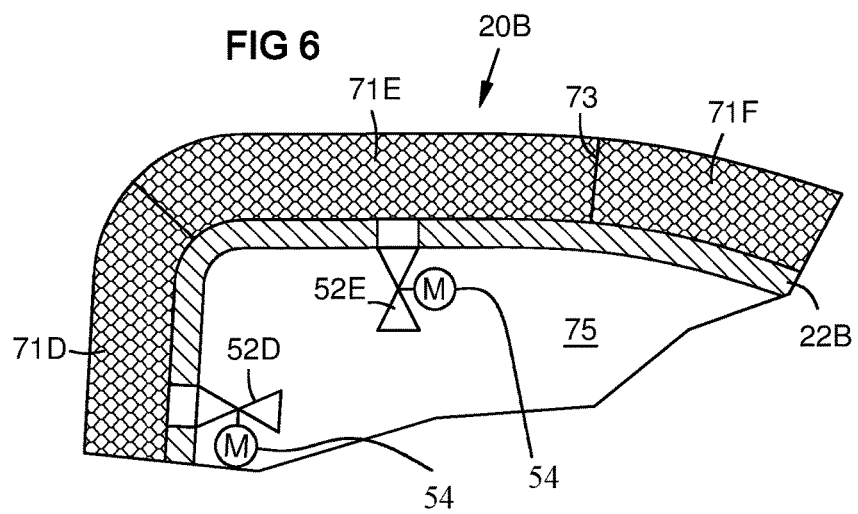

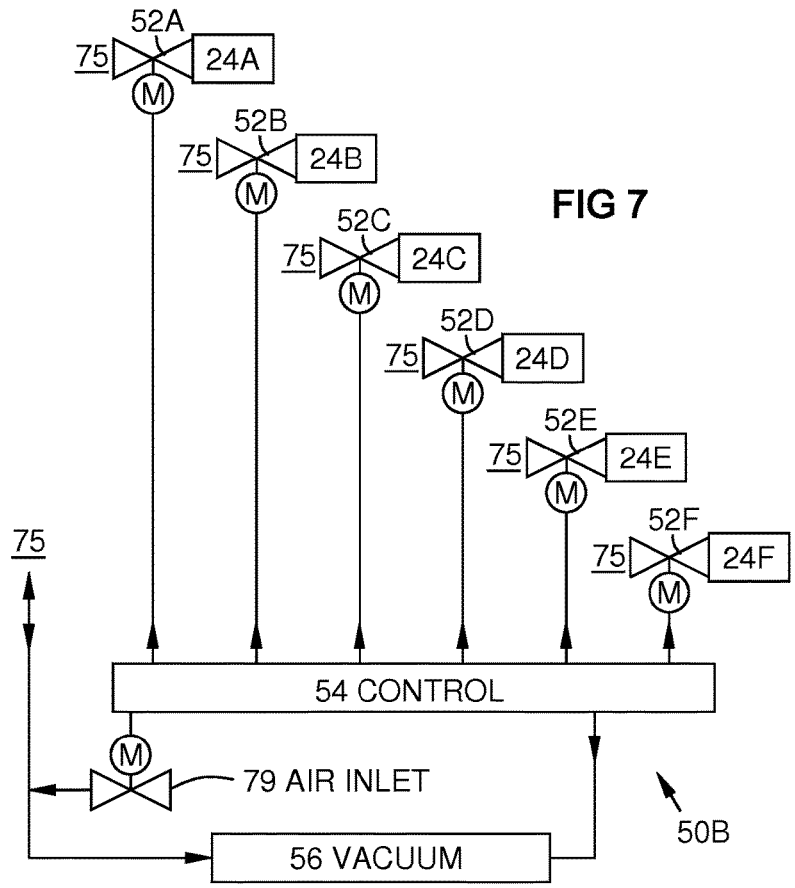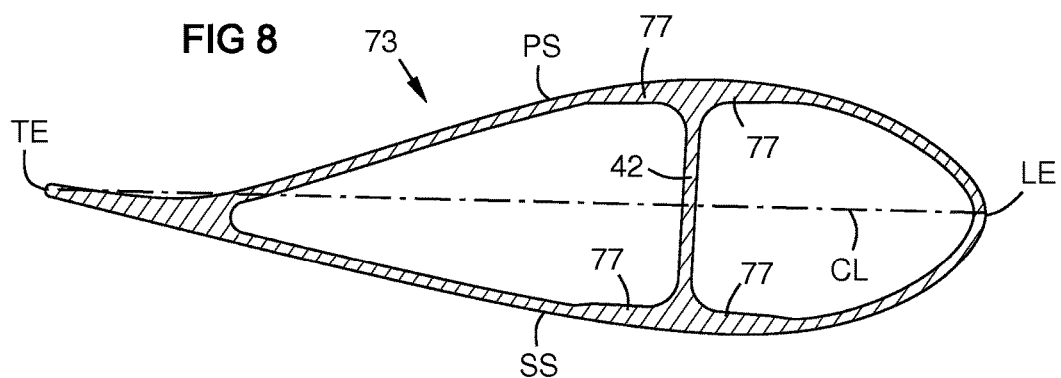

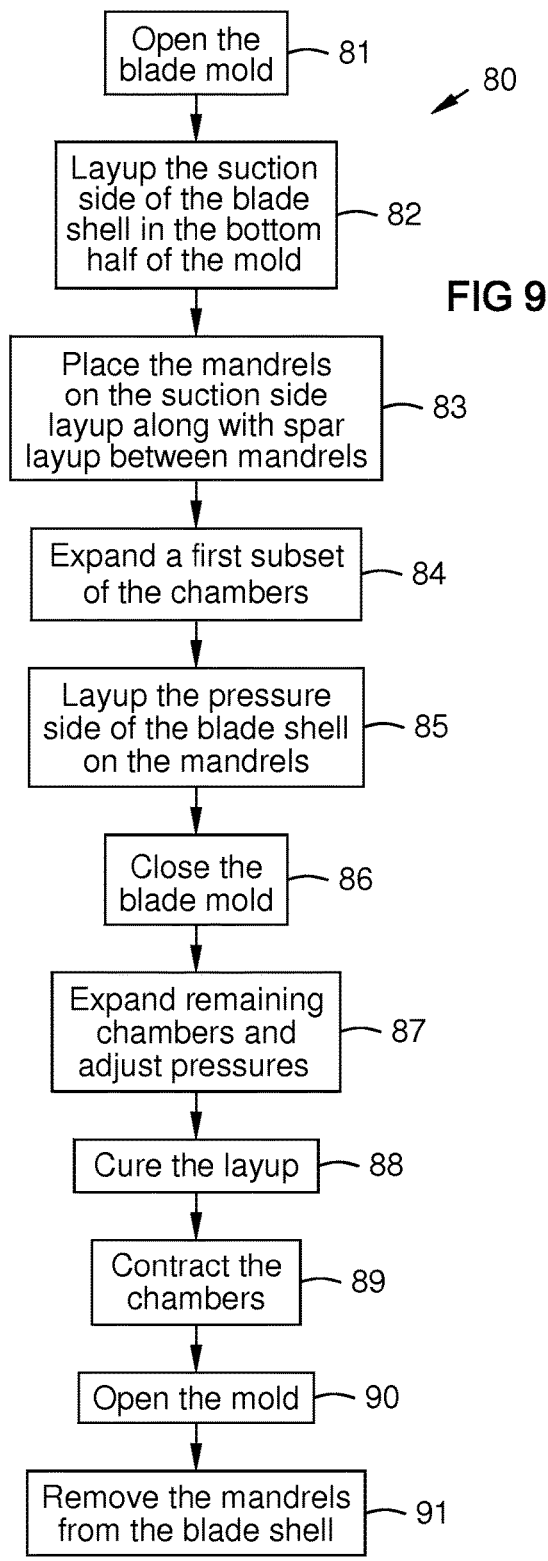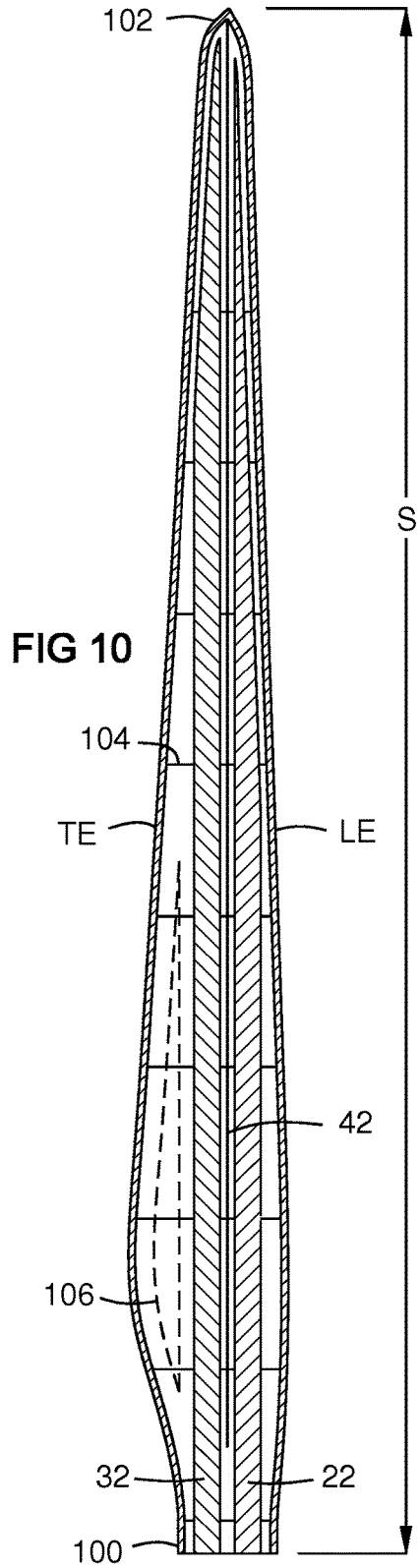

HYBRID SOLID-INFLATABLE MANDREL FOR BLADE MANUFACTURING

FIELD OF THE INVENTION

This invention relates to fabrication of wind turbine blades, and particularly to mandrels for layup of fabric for curing in a blade mold.

BACKGROUND OF THE INVENTION

In prior wind turbine blade fabrication, fiber layers such as glass or carbon fabric are laid in a horizontally oriented suction-side mold. Mandrels representing the internal void geometry of the blade are placed on this suction side layup. The fabric is then wrapped around the leading edge and pressure side of the mandrel to meet itself at the trailing edge. This makes a closed C-shaped layup with one seam at the trailing edge. A pressure side mold cover is then closed over the layup. The fabric is infused with a matrix material such as epoxy or thermosetting polymer before or after the layup steps and closing of the mold. The mandrels may be inflatable or solid, or they may have a rigid core covered with a compressible material such as foam to press the layup against the interior surfaces of the mold, as taught for example in U.S. Pat. No. 8,007,624 B2, incorporated by reference herein.

However, the mandrel may shift position while the layup is being placed on it or while the mold is closing. This occurs mostly in areas of high curvature, resulting in wrinkles and areas of enriched resin, both of which degrade structural integrity and must be repaired after the blade is removed from the mold. If the mandrel shifts too much, it can become stuck inside the blade. Mandrel shifting is possible, in part, because the air in the inflatable or foam parts can shift peripherally and/or diagonally to other locations of the mandrel cross-section. This allows the mandrel shape to be insufficiently maintained.

BRIEF DESCRIPTION OF THE DRAWINGS

The invention is explained in the following description in view of the drawings that show:

FIG. 5 schematically shows a gang valve with multiple distribution tubes to provide air to the inflatable bladders.

FIG. 6 shows a mandrel embodiment with a rigid tubular core covered by individually partitioned resilient foam-filled bladders.

FIG. 7 schematically shows a system that controls the individual inflation condition of each foam-filled bladder in the mandrel embodiment of FIG. 6.

FIG. 8 is a transverse sectional view of an exemplary blade shell formed by the mandrel embodiments herein.

FIG. 9 illustrates aspects of a method of the invention.

FIG. 10 is sectional plan view of a wind turbine blade shell with mandrels.

DETAILED DESCRIPTION OF THE INVENTION

Figure 1:
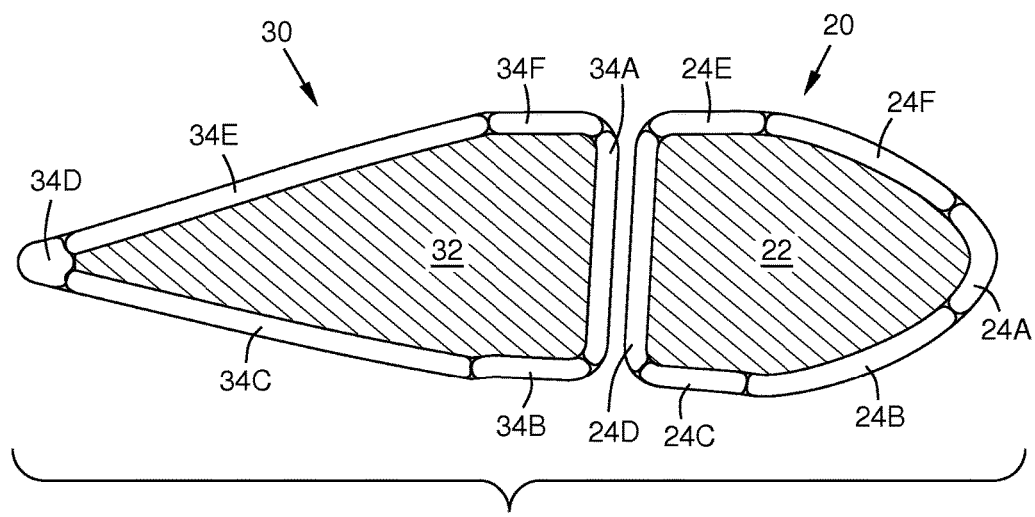
FIG. 1 is a transverse sectional view of forward and aft mandrels covered with adjacent inflatable bladders illustrating aspects of an embodiment of the invention.

FIG. 1 is a transverse sectional view of forward 20 and aft 30 mandrels covered with adjacent inflatable bladders 24A-F and 34A-F. Each mandrel has a substantially rigid core 22, 32, which may be solid or tubular. The bladders are individually partitioned around a periphery of the core. For example the forward core 22 may have a leading edge bladder 24A, a forward suction side bladder 24B, a forward suction side spar cap bladder 24C, a bladder 24D for the forward side of the spar webbing, a forward pressure side spar cap bladder 24E, and a forward pressure side bladder 24F. Bladders around the aft mandrel 32 may include a bladder 34A for an aft side of the spar webbing, an aft suction side spar cap bladder 34B, an aft suction side bladder 34C, a trailing edge bladder 34D, an aft pressure side bladder 34E, and an aft pressure side spar cap bladder 34F. The bladders may be individually valved such that air cannot shift among them at a given stage, such as during a closing of the mold, thus preventing shifting of the mandrels. The bladders may further be individually pressure controlled to adjust the position of the mandrels and the distribution of normal pressure of the bladders against the interior of the blade shell layups. This maintains the shape and position of the mandrel.

Figure 2:
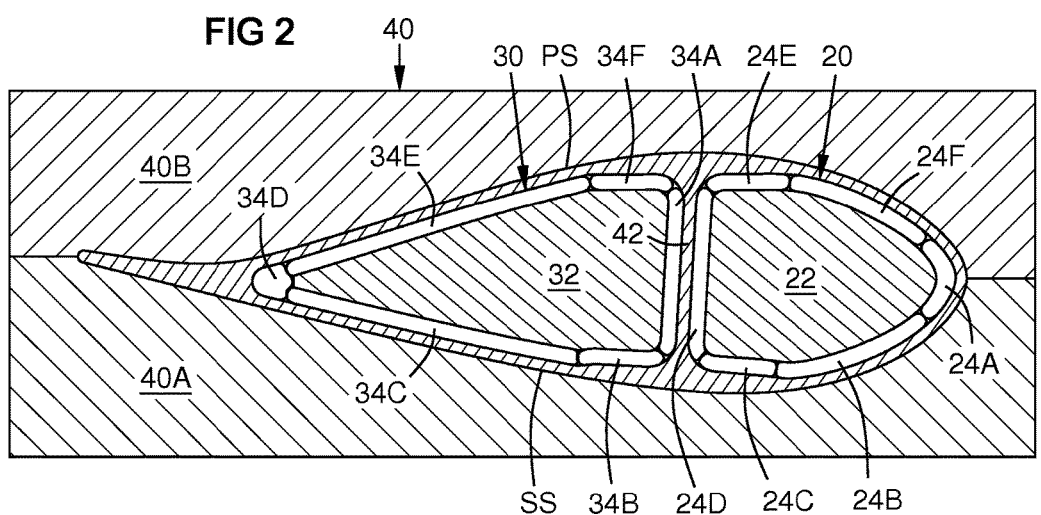
FIG. 2 is a transverse sectional view of a wind turbine blade being fabricated in a mold with the mandrels of FIG. 1.

FIG. 2 shows the mandrels of FIG. 1 wrapped in a blade shell fabric layup SS, PS and enclosed in a mold 40 with lower and upper parts 40A, 40B. The mandrels in this embodiment are spaced from each other chordwise and may be substantially parallel to provide room for blade spar webbing 42 between the suction side SS and pressure side PS of the blade shell.

Figure 3:
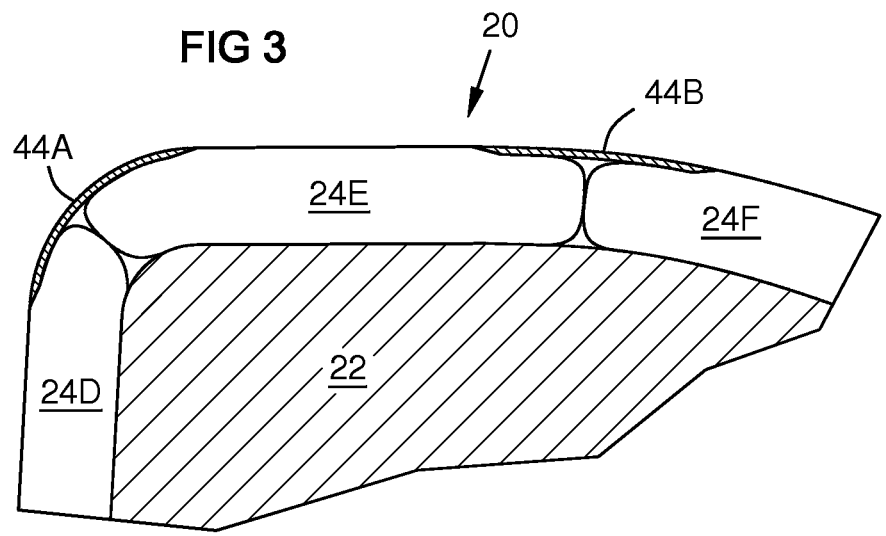
FIG. 3 is an enlarged sectional partial view of a mandrel, showing bridge plates between inflatable bladders.

FIG. 3 is an enlarge sectional partial view of mandrel 20, showing a rigid bridge plate 44A between inflatable bladders 24D and 24E, and a bridge plate 44B between inflatable bladders 24E and 24F. These bridge plates are shaped to provide smooth transitions between the bladders to avoid imprinting ridges in the layup and to accurately define respective portions of the interior surface of the shell. The bridge plates may be attached to the inflatable bladders directly or to a flexible sheet that is attached to the outer surface of the bladders. The outer surfaces of the bladders, bridge plates, and sheet may be coated with adhesion resistant material such as polytetrafluoroethylene.

Figure 4:
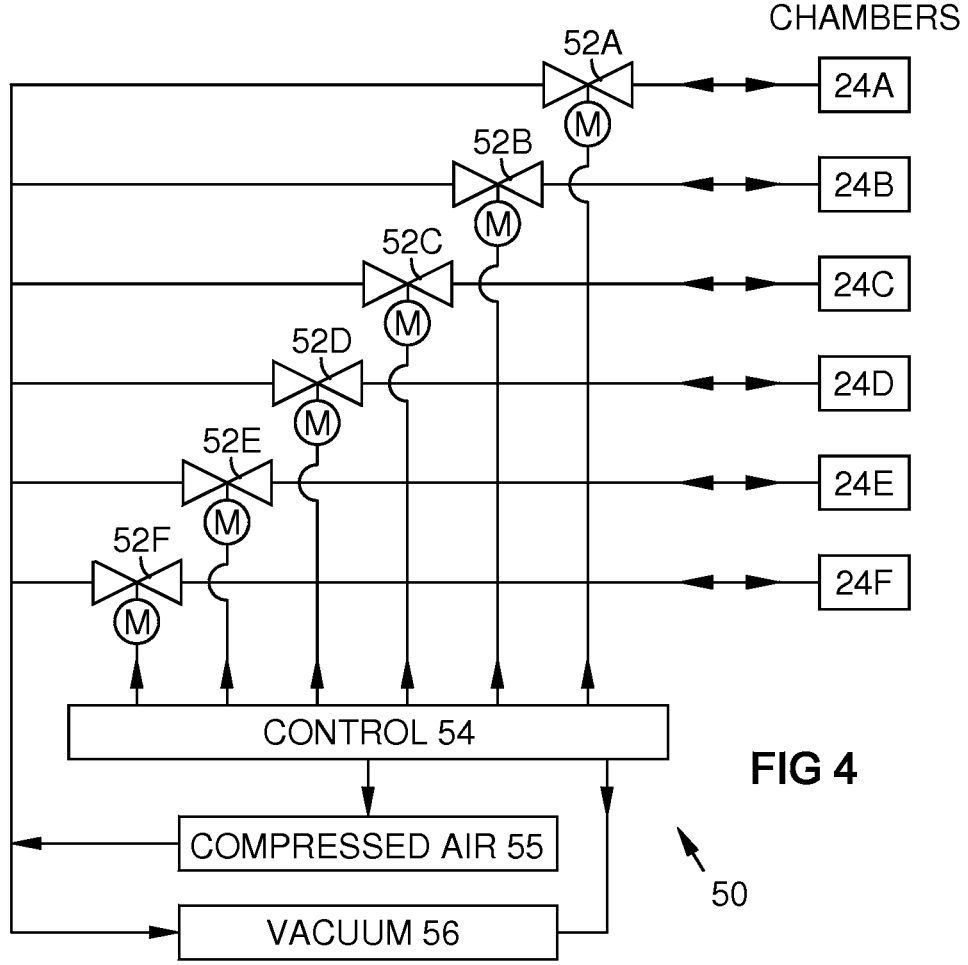
FIG. 4 is a schematic diagram of a control system with an individually actuated gas flow valve for each inflatable bladder.

FIG. 4 is a schematic diagram of a control system 50 with an individually actuated gas flow valve 52A-F for each respective inflatable bladder 24A-F. The valves are controlled by a controller 54 to expand the bladders with compressed air 55 or other gas or to contract the bladders with a vacuum 56. The valves may be operated both in unison and individually to adjust inflation rates and pressures in the bladders 24A-F. This provides fine control of the mandrel shape, position, and outward pressure.

FIG. 5 schematically shows an alternative control system embodied as a gang valve 60 with an air inlet/outlet 62, multiple air distribution tubes 63-68, and a valve cylinder 61, which may be rotated manually or automatically by a lever 70. This arrangement provides equal air pressure to all of the inflatable bladders. Optionally, each distribution inlet 72 or outlet 74 may be individually metered to provide substantially equal fill rates for inflatable bladders of different volumes. When the cylinder 61 is rotated 90 degrees, all distribution tubes 63-68 are closed. This prevents shifting of air from one bladder to another. For air removal, the valve 60 may be opened, and a vacuum pump may operate on the inlet/outlet 62.

FIG. 6 shows a mandrel embodiment 20B with a rigid tubular core 22B covered by multiple individually partitioned foam-filled bladders 71D-F containing a resilient foam such as open-cell polyurethane or polyester foam. An air distribution tube 63-68 (FIG. 5) may be provided to each bladder for individual pressure control, but such tubes are not needed in this embodiment. Instead, each bladder may be simply provided with a controllable air valve 52D, 52E to the interior 75 of the mandrel. The foam may provide sufficient inflation force so that only an air inlet 79 is needed instead of compressed air. The bladders may be deflated by providing a vacuum in the interior 75 of the mandrel tube 22B. The foam provides a self-limiting inflated shape of the bladders, and expanded by opening an air inlet valve. FIG. 7 schematically shows a control system embodiment 50B that controls the expansion of each foam-filled bladder individually in the mandrel embodiment 20B of FIG. 6.

FIG. 8 is a transverse sectional view of a an exemplary blade shell 73 formed by the mandrel embodiments herein, the shell having a leading edge LE, trailing edge TE, suction side SS, pressure side PS, and chord CL. A web 42 between the suction side and the pressure side forms an I-beam spar. Flanges or end caps 77 for the spar may be formed of additional layers or thickness on the pressure and suction sides and filleted with the web 42.

FIG. 9 illustrates aspects of a method 80 of the invention, comprising the steps:

81—Open the mold;
82—Layup the suction side of the blade shell in the bottom half of the mold;
83—Place the mandrels on the suction side layup and position a vertical layup for the spar webbing between the mandrels;
84—Expand a first proper subset of the bladders, such as the lower and middle champers 24A-D and 34A-D;
85—Layup the pressure side of the blade shell on the mandrels;
86—close the blade mold;
87—Expand the remaining bladders, such as the upper bladders 24E-F and 34E-F, and adjust the distribution of pressures;
88—Cure the blade shell;
89—Contract the bladders;
90—Open the mold; and
91—Remove the mandrels from the blade shell.

The fabric layup may be pre-impregnated with a matrix material, or impregnated after closing the mold. One example of the latter method is described in U.S. Pat. No. 8,007,624.

FIG. 10 is sectional plan view of a wind turbine blade shell with a leading edge LE, trailing edge TE, root 100, tip 102, span S, and spar web 42. Forward and aft mandrel cores 22, 32 are positioned on opposite sides of the web 42. The inflatable bladders may be partitioned 104 transversely at multiple positions along the span S of the blade shell in addition to the previously shown partitioning around the perimeter of the core as seen in a transverse section. Each transverse partition 104 may bound and define another set of bladders such as 24A-F and 34A-F of FIG. 1 around the periphery of the core with further valves thereof for additional control of pressure distribution and mandrel position. Optionally an additional mandrel core 106 may be provided in the shoulder of the blade. The rigid cores of the mandrels may be sized to fit through the root 100 for extraction after deflation or contraction of the bladders.

The expansion and contraction of the bladders herein may be controllable individually or in selectable proper subsets to adjust the position of the mandrel and the distribution of pressure on the blade shell layup.

While various embodiments of the present invention have been shown and described herein, it will be obvious that such embodiments are provided by way of example only. Numerous variations, changes and substitutions may be made without departing from the invention herein. The figures are exemplary and should not be interpreted as limiting. For example, the present invention is not limited to the blade designs having one reinforcing web, but may also be applied to blade shells having any number (or no) reinforcing webs, I-beams, box beams, etc., with the appropriate number of mandrels being used for each such design. Accordingly, it is intended that the invention be limited only by the spirit and scope of the appended claims.

The invention claimed is:

1. An apparatus for fabrication of a blade, comprising;
   a plurality of expandable bladders adjacently attached around a periphery of a substantially rigid core as seen in a transverse sectional view thereof; and
   a control system that controls an expansion condition of the bladders individually or in selectable proper subsets thereof;
   wherein the bladders are configured to provide outward force against an interior of a layup of a shell of the blade in a mold while the mold constrains an outer surface of the blade shell layup, wherein the rigid core has a hollow interior, and further comprising a resilient foam filling and expanding each of the bladders, wherein the control system comprises a gas valve that connects each bladder individually with the interior of the core, a vacuum source that evacuates the interior of the core for contracting the bladders via the gas valves, and an air inlet that communicates with the core interior allowing the bladders to expand by a rebound of the resilient foam therein.

2. The apparatus of claim 1, wherein the bladders are individually valved such that an expansion and a contraction of each bladder is individually controlled.

3. The apparatus of claim 1, wherein the bladders are valved and controlled such that an expansion gas cannot shift among them during a given stage of fabrication.

4. The apparatus of claim 1, wherein the rigid core comprises a forward mandrel core in the shell layup, and the plurality of expandable bladders comprises:
   a leading edge bladder;
   a suction side bladder;
   a forward suction side spar cap bladder;
   a bladder for a forward side of a spar webbing;
   a forward pressure side spar cap bladder; and
   a forward pressure side bladder.

5. The apparatus of claim 4, further comprising an aft mandrel core spaced aft of the forward mandrel core in the shell layup, wherein the aft mandrel core is covered by a second plurality of expandable bladders disposed around a periphery of the aft mandrel core as seen in a transverse sectional view thereof, and the second plurality of expandable bladders comprises:
   a bladder for an aft side of the spar webbing;
   an aft suction side spar cap bladder;
   a suction side bladder;
   a trailing edge bladder;
   an aft pressure side bladder; and
   an aft pressure side spar cap bladder.

6. The apparatus of claim 1, wherein the control system further comprises:
- a valve and a gas distribution tube for each bladder;
- a compressed air source for expanding the bladders via the distribution tubes; and
- a vacuum source for contracting the bladders via the distribution tubes.

7. An apparatus for fabrication of a blade, comprising:
- a plurality of expandable bladders adjacently attached around a periphery of a substantially rigid core as seen in a transverse sectional view thereof; and
- a control system that controls an expansion condition of the bladders individually or in selectable proper subsets thereof;
- wherein the bladders are configured to provide outward force against an interior of a layup of a shell of the blade in a mold while the mold constrains an outer surface of the blade shell layup comprising a rigid bridge plate spanning between adjacent ones of the bladders and defining respective portions of an interior surface of the blade shell.

8. An apparatus for fabrication of a blade, comprising:
- a forward mandrel and an aft mandrel, each mandrel being elongated spanwise and comprising a plurality of expandable bladders disposed around a periphery of a respective substantially rigid core of the respective mandrel as seen in a transverse section thereof, forming an expandable outer cover of the respective mandrel;
- the forward and aft mandrels configured to define respective forward and aft void geometries of a blade interior; and
- a control system that expands and contracts the expandable bladders individually or in selectable proper subsets thereof.

9. A blade fabrication method, comprising:
- providing an apparatus as in claim 8;
- placing a suction side fabric layup in a bottom half of a mold for a blade shell;
- placing the forward and aft mandrels on respective forward and aft sides of the suction side layup, wherein the mandrels are substantially parallel and are spaced chordwise from each other;
- positioning a spar webbing layup between the mandrels;
- expanding at least a proper subset of the bladders;
- placing a pressure side fabric layup on the mandrels;
- closing the mold over the pressure side fabric layup; and
- adjusting an expansion of the bladders individually or in selected proper subsets thereof to provide a predetermined distribution of pressure of the bladders on the blade shell during a curing thereof.

10. The apparatus of claim 8, wherein the rigid core has a hollow interior, and further comprising a resilient foam filling and expanding each of the bladders, wherein the control system comprises a gas valve that connects each bladder individually with the interior of the core, a vacuum source that evacuates the interior of the core for contracting the bladders via the gas valves, and an air inlet that communicates with the core interior allowing the bladders to expand by a rebound of the resilient foam therein.

11. The apparatus of claim 8, further comprising a rigid bridge plate spanning between adjacent ones of the bladders and defining respective portions of an interior surface of the blade shell.

12. The apparatus of claim 7, wherein the bladders are individually valved such that an expansion and a contraction of each bladder is individually controlled.

13. The apparatus of claim 7, wherein the bladders are valved and controlled such that an expansion gas cannot shift among them during a given stage of fabrication.

14. The apparatus of claim 7, wherein the rigid core comprises a forward mandrel core in the shell layup, and the plurality of expandable bladders comprises:
- a leading edge bladder;
- a suction side bladder;
- a forward suction side spar cap bladder;
- a bladder for a forward side of a spar webbing;
- a forward pressure side spar cap bladder; and
- a forward pressure side bladder.

15. The apparatus of claim 14, further comprising an aft mandrel core spaced aft of the forward mandrel core in the shell layup, wherein the aft mandrel core is covered by a second plurality of expandable bladders disposed around a periphery of the aft mandrel core as seen in a transverse sectional view thereof, and the second plurality of expandable bladders comprises:
- a bladder for an aft side of the spar webbing;
- an aft suction side spar cap bladder;
- a suction side bladder;
- a trailing edge bladder;
- an aft pressure side bladder; and
- an aft pressure side spar cap bladder.

16. The apparatus of claim 7, wherein the control system further comprises:
- a valve and a gas distribution tube for each bladder;
- a compressed air source for expanding the bladders via the distribution tubes; and
- a vacuum source for contracting the bladders via the distribution tubes.

* * * * *